(12) United States Patent
Zhou et al.

(10) Patent No.: US 12,414,196 B2
(45) Date of Patent: Sep. 9, 2025

(54) METHOD AND DEVICE FOR DISCONTINUOUS RECEPTION OPERATION ON SIDELINK COMMUNICATION CHANNEL

(71) Applicant: HUAWEI TECHNOLOGIES CO., LTD., Guangdong (CN)

(72) Inventors: Chan Zhou, Munich (DE); Apostolos Kousaridas, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 448 days.

(21) Appl. No.: 17/973,353

(22) Filed: Oct. 25, 2022

(65) Prior Publication Data
US 2023/0062341 A1 Mar. 2, 2023

Related U.S. Application Data

(63) Continuation of application No. PCT/EP2020/061891, filed on Apr. 29, 2020.

(51) Int. Cl.
*H04W 76/28* (2018.01)
*H04W 76/23* (2018.01)

(52) U.S. Cl.
CPC ........... *H04W 76/28* (2018.02); *H04W 76/23* (2018.02)

(58) Field of Classification Search
CPC ............................ H04W 76/28; H04W 76/23
See application file for complete search history.

(56) References Cited

U.S. PATENT DOCUMENTS

| | | | |
|---|---|---|---|
| 2016/0366645 A1 | 12/2016 | Song et al. | |
| 2017/0273137 A1* | 9/2017 | Wu | H04W 64/003 |
| 2019/0053323 A1 | 2/2019 | Siomina et al. | |
| 2019/0313376 A1 | 10/2019 | Zhou et al. | |
| 2023/0014303 A1* | 1/2023 | Di Girolamo | H04W 72/20 |

(Continued)

FOREIGN PATENT DOCUMENTS

| | | |
|---|---|---|
| CN | 104871635 A | 8/2015 |
| JP | 2012530405 A | 11/2012 |
| JP | 2018061188 A | 4/2018 |

(Continued)

OTHER PUBLICATIONS

3GPP TS 36.304 V9.1.0, "3rd Generation Partnership Project; Technical Specification Group Radio Access Network; Evolved Universal Terrestrial Radio Access (E-UTRA); User Equipment (UE) Procedures in Idle Mode (Release 9)", Dec. 2009, 31 pages.

(Continued)

*Primary Examiner* — Michael Thier
*Assistant Examiner* — Tracy Lauren Raimondo
(74) *Attorney, Agent, or Firm* — Fish & Richardson P.C.

(57) ABSTRACT

The present disclosure relates to sidelink DRX operation in the UEs. One example method comprises: receiving by a first UE a first set of DRX configuration parameters from a network device, wherein the first set of DRX configuration parameters comprise: a set of cellular link DRX configuration parameters between the first UE and the network device, and a first set of sidelink DRX configuration parameters for device to device (D2D) communication; operating, by the first UE, in DRX mode on the sidelink communication according to the first set of DRX configuration parameters.

20 Claims, 8 Drawing Sheets

(56) References Cited

U.S. PATENT DOCUMENTS

2023/0337140 A1* 10/2023 Miao ................ H04L 5/0053

FOREIGN PATENT DOCUMENTS

| WO | 2017078783 A1 | 5/2017 |
|---|---|---|
| WO | 2018016882 A1 | 1/2018 |
| WO | 2018064477 A1 | 4/2018 |
| WO | 2020042783 A1 | 3/2020 |

OTHER PUBLICATIONS

3GPP TS 36.331 V16.0.0, "3rd Generation Partnership Project; Technical Specification Group Radio Access Network; Evolved Universal Terrestrial Radio Access (E-UTRA); Radio Resource Control (RRC); Protocol Specification (Release 16)", Mar. 2020, 1048 pages.
3GPP TS 36.321 V16.0.0, "3rd Generation Partnership Project; Technical Specification Group Radio Access Network; Evolved Universal Terrestrial Radio Access (E-UTRA); Medium Access Control (MAC) Protocol Specification (Release 16)," Mar. 2020, 141 pages.
Liang et al., "Energy-Efficient DRX Scheduling for D2D Communication in 5G Networks," Journal of Network and Computer Applications, vol. 116, Aug. 15, 2018, 12 pages.
Huawei et al., "Some Considerations About DRX on PC5," 3GPP TSG RAN WG2#98, R2-1704718, Hangzhou, China, May 15-19, 2017, 4 pages.
LG Electronics, "New WID on NR Sidelink Enhancement," 3GPP TSG RAN Meeting #86, RP-193231, Sitges, Spain, Dec. 9-12, 2019, 6 pages.
3GPP TS 38.304 V16.0.0, "3rd Generation Partnership Project; Technical Specification Group Radio Access Network; NR; User Equipment (UE) Procedures in Idle Mode and RRC Inactive State (Release 16)," Mar. 2020, 38 pages.
3GPP TS 38.321 V16.0.0, "3rd Generation Partnership Project; Technical Specification Group Radio Access Network; NR; Medium Access Control (MAC) Protocol Specification (Release 16)," Mar. 2020, 141 pages.
3GPP TS 38.331 V16.0.0, "3rd Generation Partnership Project; Technical Specification Group Radio Access Network; NR; Radio Resource Control (RRC) Protocol Specification (Release 16)," Mar. 2020, 835 pages.
International Search Report and Written Opinion in International Appln. No. PCT/EP2020/061891, mailed on Mar. 4, 2021, 11 pages.
Office Action in Japanese Appln. No. 2022-564010, mailed on Oct. 31, 2023, 6 pages (with English translation).

* cited by examiner

METHOD AND DEVICE FOR DISCONTINUOUS RECEPTION OPERATION ON SIDELINK COMMUNICATION CHANNEL

CROSS-REFERENCE TO RELATED APPLICATIONS

This application is a continuation of International Application No. PCT/EP2020/061891, filed on Apr. 29, 2020. The disclosure of which is hereby incorporated by reference in its entirety.

TECHNICAL FIELD

The present disclosure relates to discontinuous reception, DRX, operation for sidelink in wireless or radio network. The disclosure is specifically concerned with configuration of DRX for sidelink. To this end, embodiments of the invention provide sidelink DRX configuration method considering different scenarios. Further, embodiments of the invention provide apparatus which support the sidelink configuration as the method.

BACKGROUND

Device to Device, D2D, communication is applied to a number of approximate services, e.g. local voice and data service, content sharing, etc. The approximate services also further contain the category of the vehicle-to-everything, V2X, services, which connect a vehicle with other vehicles, pedestrians or infrastructures in the proximate area.

Different to the cellular communication which bases on the network infrastructure consisting of base stations, BS, and backhaul, the D2D communication transmits the payload data directly between the terminal devices, although in some cases the cellular network, in particular base stations, is involved in the control and coordination procedure.

Since the terminal devices, often mobile devices, usually supplied by battery, the power efficiency should be considered by the design of a mobile communication system. DRX and sleep mode have been introduced to cellular communication system, which are proven to be able to effectively reduce the power consumption and extend the battery life of the terminal devices.

DRX has been implemented in the cellular network to reduce the power consumption and meanwhile keep the necessary connectivity between base station and terminal devices in the 3$^{rd}$ Generation Partnership Project, 3GPP, technical specification, TS, 36.304, 3GPP TS 36.331, 3GPP TS 36.321 etc.

When the terminal device, called also as User Equipment, UE, in 3GPP, is in the connect mode, the terminal devices is prepared for an active communication via the base station. If there is no actually data transmission for a certain period, the terminal device will turn into the sleep mode in which the reception and the monitoring process of the terminal device are stopped for a certain period.

Above similar concepts and schemes may also be developed for D2D communication systems because power saving is very critical in the D2D communication as well. How to apply the similar concepts and/or schemes on the D2D communication is under discussion and some details should be addressed.

SUMMARY

The embodiments of the present invention are defined by the appended claims. In the following, parts of the description and drawings referring to embodiments, which are not covered by the claims, are not presented as embodiments of the invention, but as examples useful for understanding the invention.

An objective of embodiments of the disclosure is to provide a solution which reduces the signaling overhead for sidelink DRX configuration and coordinates the DRX operation over the sidelink.

The above and further objectives are solved by the subject matter of the independent claims. Further advantageous embodiments of the disclosure can be found in the dependent claims.

According to a first aspect of the disclosure, the above mentioned and other objectives are achieved with a method of sidelink discontinuous reception, DRX, operation in a first UE, comprising:
  receiving, by the first UE, a first set of DRX configuration parameters from a network device, wherein the first set of DRX configuration parameters comprises: cellular link DRX configuration parameters between the first UE and the network device, and a first set of sidelink DRX configuration parameters for device to device, D2D, communication;
  operating, by the first UE, in DRX mode on the sidelink communication according to the first set of DRX configuration parameters.

The first UE receives the first set of DRX configuration parameters from the network device, and the first UE is in the coverage of the network device and/or be controlled by the network device.

An advantage of the first UE according to the first aspect is that the first UE may be configured with sidelink DRX configuration parameters and save the energy of the first UE, and the DRX over the sidelink are coordinated among different UEs. This is especially the case when the first UE is in the coverage of the network device and controlled by the network device.

In a first implementation form of the first UE according to the first aspect, the first set of sidelink DRX configuration parameters comprises delta configuration information, wherein the delta configuration information indicates differential a quantity relative to the cellular link DRX configuration parameters.

An advantage of the first implementation form of the first UE according to the first aspect is that the delta configuration reduces the signaling overhead of the sidelink DRX configuration parameters.

In a second implementation form of the first UE according to the first aspect, the method further comprising: sending, by the first UE, preferred sidelink DRX configuration parameters to the network device, wherein the preferred sidelink DRX configuration parameters indicate confirmation of the received DRX configuration parameters, or a set of sidelink DRX configuration parameters preferred by the first UE.

The preferred sidelink DRX configuration parameters may be the confirmation to the network device, or a new set of preferred sidelink DRX configuration parameters may be provided to network device in the response.

An advantage of the second implementation form of the first UE according to the first aspect is that the UE may confirm or provide the preferred sidelink DRX configuration parameters to optimize the sidelink DRX configuration parameters.

In a third implementation form of the first UE according to the first aspect, the method further comprising: sending, by the first UE, report and/or update of preferred sidelink DRX configuration parameters to the network device.

The UE may report/update the preferred sidelink DRX configuration parameters at any time.

An advantage of the third implementation form of the first UE according to the first aspect is that the UE may report/update the preferred sidelink DRX configuration parameters to optimize the sidelink DRX configuration parameters, in particularly the state of the UE changed, e.g. mobility state or power status etc.

In a forth implementation form of the first UE according to the first aspect, the set of cellular link DRX configuration parameters comprises at least one of: inactivity timer, short DRX cycle, short DRX cycle timer, on duration timer, long DRX cycle timer, or long DRX start offset.

The cellular link DRX configuration parameters may also include other parameters, e.g. slot offset, retransmission timer for downlink, retransmission timer for uplink, HARQ RTT timer DL, or HARQ RTT timer UL etc.

An advantage of the fourth implementation form of the first UE according to the first aspect is that it enables the simplified configuration of the set of sidelink DRX configuration parameters. The parameters may be grouped or set individually.

In a fifth implementation form of the first UE according to the first aspect, the delta configuration information comprises at least one of: group indicator, type indicator, or value of delta.

An advantage of the fifth implementation form of a first UE according to the first aspect is that it makes the configuration of the set of sidelink DRX configuration parameters flexible. Different type of a differentiate quantities may be supported for reducing the signaling overhead.

In a sixth implementation form of the first UE according to the first aspect, the method further comprises:
- receiving, by the first UE, an activation command from the network device, wherein the activation command is used to activate or change the first set of sidelink DRX configuration parameters; or,
- sending, by the first UE, a sidelink communication request to the network device.

For network device controlled sidelink communication, the set of sidelink DRX configuration parameters may be configured first and activated by the network device. The first UE may send request to the network device in order to operate the sidelink communication.

An advantage of the sixth implementation form of a first UE according to the first aspect is that explicit activation of sidelink DRX operation may further reduce the power saving because the sidelink operation may stay in sleep mode before activation.

According to a second aspect of the disclosure, a method for sidelink discontinuous reception, DRX, operation in a network device is provided, the method comprising:
- obtaining, by the network device, a first set of DRX configuration parameters;
- sending, by the network device, the first set of DRX configuration parameters to a first user equipment, UE, wherein the first set of DRX configuration parameters comprises a set of cellular link DRX configuration parameters between the first UE and the network device, and a first set of sidelink DRX configuration parameters for device to device, D2D, communication.

The network device sends the first set of DRX configuration parameters to the first UE, and the first UE is in the coverage of the network device and/or be controlled by the network device.

An advantage according to the first aspect is that the network may configure the first UE with a set of sidelink DRX configuration parameters and save the energy of the first UE, and the DRX on the sidelink are coordinated among different UEs by the network device. This is especially the case when the first UE is in the coverage of the network device and controlled by the network device.

In a first implementation form of the network device according to the second aspect, the first set of sidelink DRX configuration parameters comprises delta configuration information, wherein the delta configuration information indicates a differential quantity relative to the set of cellular link DRX configuration parameters.

An advantage of the first implementation form of a first UE according to the second aspect is that the delta configuration reduces the signaling overhead of the set of sidelink DRX configuration parameters.

In a second implementation form of the network device according to the second aspect, the method further comprising: receiving, by the network device, preferred sidelink DRX configuration parameters from the first UE, wherein the preferred sidelink DRX configuration parameters indicate confirmation of receiving of the first set of DRX configuration parameters, or a set of sidelink DRX configuration parameters preferred by the first UE.

The preferred sidelink DRX configuration parameters may be confirmed by the first UE, and/or a new set of preferred sidelink DRX configuration parameters may be provided by the first UE in the response. The preferred sidelink DRX configuration parameters may be the optimal sidelink DRX configuration parameters.

An advantage of the second implementation form of the network device according to the second aspect is that the network device may be provided with the preferred sidelink DRX configuration parameters to optimize the sidelink DRX configuration parameters.

In a third implementation form of the network device according to the second aspect, the method further comprising: receiving, by the network device, report and/or update of preferred sidelink DRX configuration parameters from the first UE.

The network device may receive the report/update of the preferred sidelink DRX configuration parameters at any time.

An advantage of the third implementation form of the network device according to the second aspect is that the network device may obtain the report/update of the preferred sidelink DRX configuration parameters to optimize the sidelink DRX configuration parameters, in particularly when the state of the UE changed, e.g. mobility state or power status etc.

In a forth implementation form of the network device according to the second aspect, the cellular link DRX configuration parameters comprise at least one of: inactivity timer, short DRX cycle, short DRX cycle timer, on duration timer, long DRX cycle timer, or long DRX start offset.

The set of cellular link DRX configuration parameters may also include other parameters, e.g. slot offset, retransmission timer for downlink, Retransmission timer for uplink, HARQ RTT timer DL, or HARQ RTT timer UL etc.

An advantage of the fourth implementation form of the network device according to the second aspect is that it enables the simplified configuration of sidelink DRX configuration parameters. The parameters may be set individually or in a group together.

In a fifth implementation form of the network device according to the second aspect, the delta configuration information comprises at least one of: group indicator, type indicator, or value of delta.

An advantage of the fifth implementation form of the network device according to the second aspect is that it makes the configuration of the sidelink DRX configuration parameters flexible. Different type of differentiate quantities may be supported for reducing the signaling overhead.

According to a third aspect of the disclosure, a method for sidelink discontinuous reception, DRX, operation in a second user equipment, UE, comprising:

sending, by the second UE, a second set of sidelink DRX configuration parameters over a sidelink communication channel, wherein the second set of sidelink DRX configuration parameters comprises the configuration of a first set of notification windows, wherein the first set of notification windows indicates the opportunities of receiving data by the second UE;

receiving, by the second UE, a second signal and/or a second data at the first set of notification windows.

The second UE sends the second set of sidelink DRX configuration parameters over a sidelink communication channel, and the second UE is out of the coverage of a network device, or the sidelink communication of the second UE is not fully controlled by the cellular network.

An advantage of the second UE according to the third aspect is that the second UE may send the set of sidelink DRX configuration parameters to other UE(s) nearby and the other UE(s) may communicate with the second UE during the notification windows indicated in the set of sidelink DRX configuration parameters. In this way, the DRX over the sidelink are coordinated among different UEs. The second UE is able to save energy through this sidelink DRX process and meanwhile the second UE will not miss the notification sent to it. This is especially the case when the second UE is out of the coverage of the network device and/or not fully controlled by the network device.

In a first implementation form of the second UE according to the third aspect, the second set of sidelink DRX configuration parameters comprises at least one of: ID of the second UE, notification cycle timer, notification frame offset, index of the notification occasion.

An advantage of the first implementation form of the second UE according to the third aspect is that the notification occasions may be determined according to the configuration, and/or the probability of collision among UEs may be reduced. On the other hand, the energy of the second UE may be saved. The ID of the second UE may help the addressing and the detection of the signal/data belong to the second UE.

In a second implementation form of the second UE according to the third aspect, the method further comprising: receiving, by the second UE, the second set of sidelink DRX configuration parameters from a network device.

The second set of sidelink DRX configuration parameters may be configured by a network device when the second UE is in the coverage of the network device and will be used when the second UE is out of the coverage/control of the network device.

An advantage of the second implementation form of the second UE according to the third aspect is that the UE may be configured with the second set of sidelink DRX configuration parameters which are globally coordinated within the system, and the collision probability may be optimized globally.

In a third implementation form of the second UE according to the third aspect, the method further comprising: receiving, by the second UE, a third set of sidelink DRX configuration parameters from a third UE, wherein the third set of sidelink DRX configuration parameters comprises the configuration of a second set of notification windows, wherein the second set of notification windows indicates the opportunities of receiving signal/data by the third UE.

The second UE may receive the third set of sidelink DRX configuration parameters of other UEs nearby and use the third set of sidelink DRX configuration parameters to transmit/receive signal/data to/from the other UEs. The second UE may behavior as transmitting UE in some cases, and behavior as receiving UE in some other cases.

An advantage of the third implementation form of the second UE according to the third aspect is that the UE may receive the third set of sidelink DRX configuration parameters and coordinate the signal/data transmission on the sidelink with the third UE(s). The coordination may reduce the probability of collision and/or missing of data receiving. The third implementation according to the third aspect may also save the energy consuming of the second UE.

In a fourth implementation form of the second UE according to the third aspect, the method further comprising: sending, by the second UE, a third signal and/or a third data to the third UE at the second set of notification windows.

An advantage of the fourth implementation form of the second UE according to the third aspect is that the UE may reduce the probability of missing the signal/data from the third UE due to the coordinated DRX configuration over the sidelink.

In a fifth implementation form of the second UE according to the third aspect, the second signal and/or the second data comprise the identifier of the second UE, and, wherein the third signal and/or the third data comprise the identifier of the third UE.

An advantage of the fifth implementation form of the second UE according to the third aspect is that it ensures that the third UE may detect that the signal/data is addressing the third UE based on the identifier included in the second signal/data.

In a sixth implementation form of the second UE according to the third aspect, the signal received at the first set of notification windows comprises an indication of further transmission over the sidelink.

An advantage of the sixth implementation form of the second UE according to the third aspect is that it increases the flexibility of data transmission at the notification windows and more data may be transmitted using further resource.

In a seventh implementation form of the second UE according to the third aspect, the method comprises: sensing, by the second UE, signal sent at the first set of notification windows in order to detect any transmission.

The sensing may base on the receiving power at the second UE. If the receiving power is over certain threshold and decoding failed, the second UE may continue to detect/monitor one or more subframes/slots.

An advantage of the seventh implementation form of the second UE according to the third aspect is that the UE may detect the event of transmission and prepare for the receiving of a retransmission if the decoding of the first transmission fails. The resource efficiency may be improved because the retransmission consumes frequency resource. This solution may further reduced the transmission delay because the next notification window may only be utilized for detection of data transmission.

According to a fourth aspect of the disclosure, a first user equipment, UE, for sidelink discontinuous reception, DRX, operation is described, comprising:

a transceiver, wherein the transceiver being configured to:
        receive a first set of DRX configuration parameters from a network device, wherein the first set of DRX configuration parameters comprises: a set of cellular link DRX configuration parameters between the first UE and the network device, and a first set of sidelink DRX configuration parameters for device to device, D2D, communication; and,
    a processor, wherein the processor being configured to:
operate in DRX mode on the sidelink communication according to the first set of DRX configuration parameters.

The first UE receives the first set of DRX configuration parameters from the network device, and the first UE is in the coverage of the network device and/or controlled by the network device.

An advantage of the first UE according to the fourth aspect is that the first UE may be configured with a set of sidelink DRX configuration parameters and save the energy of the first UE, and the DRX over the sidelink are coordinated among different UEs. This is especially the case when the first UE is in the coverage of the network device and controlled by the network device.

In other implementation forms of the first UE according to the fifth aspect, the first UE may implement the method of the first implementation to fifth implementation of the first aspect of the disclosure.

According to a fifth aspect of the disclosure, a network device for sidelink discontinuous reception, DRX, operation, comprising:

a processor, wherein the processor being configured to:
    obtain a first set of DRX configuration parameters; and,
    a transceiver, wherein the transceiver being configured to:
        send the first set of DRX configuration parameters to a first user equipment, UE, wherein the first set of DRX configuration parameters comprises a set of cellular link DRX configuration parameters for communication between the first UE and the network device, and a first set of sidelink DRX configuration parameters for device to device, D2D, communication.

The network device sends the first set of DRX configuration parameters to the first UE, and the first UE is in the coverage of the network device and/or be controlled by the network device.

An advantage according to the fifth aspect is that the network may configure the first UE with a set of sidelink DRX configuration parameters and save the energy of the first UE, and the DRX over the sidelink are coordinated among different UEs by the network device. This is especially the case when the first UE is in the coverage of the network device and controlled by the network device.

In other implementation forms of the first UE according to the fourth aspect, the network device may implement the method of the first implementation to fifth implementation of the second aspect of the disclosure.

According to a sixth aspect of the disclosure, a second user equipment, UE, for sidelink discontinuous reception, DRX, operation, comprising:

a transceiver, wherein the transceiver being configured to:
        send a second set of sidelink DRX configuration parameters on a sidelink communication channel, wherein the second set of sidelink DRX configuration parameters comprises the configuration of a first set of notification windows, wherein the first set of notification windows indicates the opportunities of receiving data by the second UE; and,
    a processor, wherein the processor being configured to:
        receive a second signal and/or a second data at the first set of notification windows.

The second UE sends the second set of sidelink DRX configuration parameters over a sidelink communication channel, and the second UE is out of the coverage of a network device or the sidelink communication of the second UE is not fully controlled by the cellular network.

An advantage of the second UE according to the fifth aspect is that the second UE may notify the set of sidelink DRX configuration parameters to other UE(s) nearby and the other UE(s) may communicate with the second UE during the notification windows indicated in the set of sidelink DRX configuration parameters In this way, the DRX over the sidelink are coordinated among different UEs. The second UE is able to save energy through this sidelink DRX process and meanwhile the second UE will not miss the notification sent to it. This is especially the case when the second UE is out of the coverage of the network device and/or not fully controlled by the network device.

In other implementation forms of the first UE according to the sixth aspect, the network device may implement the method of the first implementation to fifth implementation of the third aspect of the disclosure.

According to a seventh aspect of the disclosure, a user equipment, UE, for sidelink discontinuous reception, DRX, operation, comprising:

a processor, and
    a memory coupled to the processor and having processor-executable instructions stored thereon, which when executed by the processor, cause the processor to perform the various method of the first aspect, or to perform the various method of the third aspect.

An advantage of the UE according to the seventh aspect is the same as the first aspect and/or the third aspect described above.

According to eighth aspect of the disclosure, a network device for sidelink discontinuous reception, DRX, operation, comprising:

a processor, and
    a memory coupled to the processor and having processor-executable instructions stored thereon, which when executed by the processor, cause the processor to perform the various method of the second aspect.

An advantage of the network device according to the eighth aspect is the same as the second aspect described above.

According to ninth aspect of the disclosure, a non-transitory machine-readable storage medium having stored thereon processor-executable instructions, which when executed by a processor of a user equipment, UE, cause the UE to implement a method for sidelink discontinuous reception, DRX, operation as various method of the first aspect, or to perform the various method of the third aspect.

An advantage of the UE according to the ninth aspect is the same as the first aspect and/or the third aspect described above.

According to ninth aspect of the disclosure, a non-transitory machine-readable storage medium having stored thereon processor-executable instructions, which when executed by a processor of a network device, cause the network device to implement various method of the third aspect.

An advantage of the UE according to the ninth aspect is the same as the second aspect described above.

According to a tenth aspect a computer program product is provided comprising a non-transitory computer-readable storage medium carrying program code which causes a computer or a processor to perform the method according to the first aspect and/or the method according to the second aspect and/or the method according to the third aspect when the program code is executed by the computer or the processor.

Details of one or more embodiments are set forth in the accompanying drawings and the description below. Other features, objects, and advantages will be apparent from the description, drawings, and claims.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
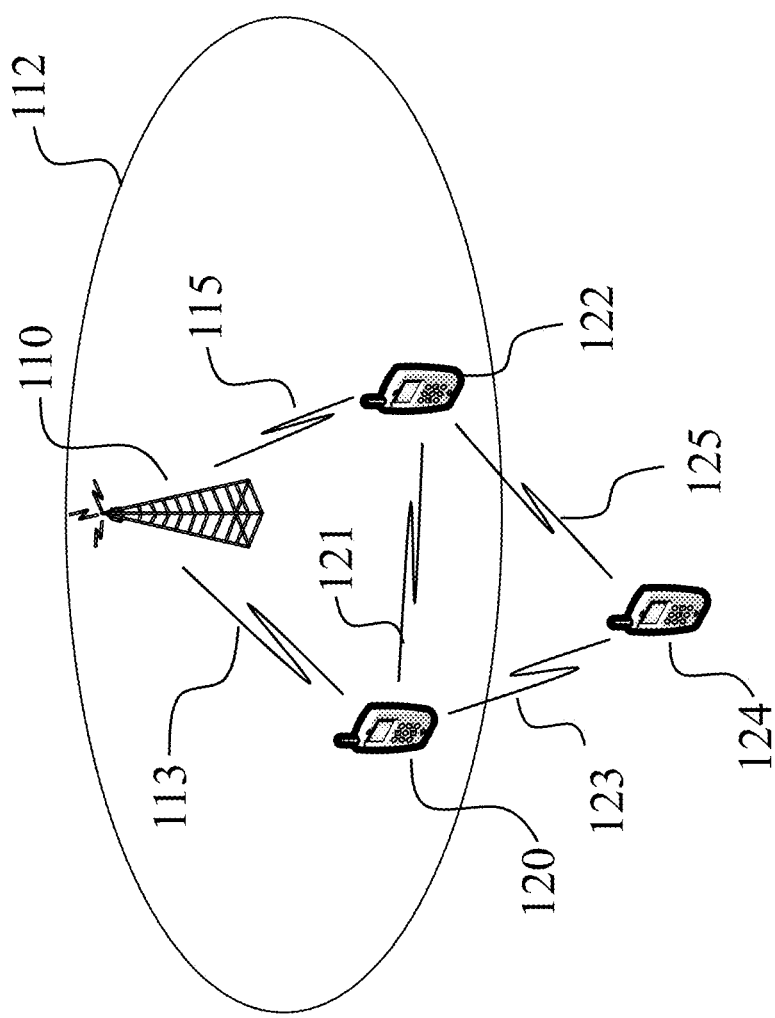
FIG. 1 shows a system supporting D2D communication.

In the following description, reference is made to the accompanying figures, which form part of the disclosure, and which show, by way of illustration, specific aspects of embodiments or specific aspects in which embodiments may be used. It is understood that embodiments may be used in other aspects and comprise structural or logical changes not depicted in the figures. The following detailed description, therefore, is not to be taken in a limiting sense.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps) in software or hardware, even if such one or more units are not explicitly described or illustrated in the figures.

Further, it is understood that the features of the various exemplary embodiments and/or aspects described herein may be combined with each other, unless specifically noted otherwise.

In the description of present disclosure, the "I" means "or" if no specific specification. For example, A/B means A or B. "and/or" descripts the relationship between objects. For example, "A and/or B" includes A, A and B, and B.

It should be understood that the names of messages and/or entities used in the embodiments of the present invention are just for easy of description, and the names may be different name in real system or standard specification. The names used in the embodiments of the present invention should not be understood as limit for the embodiments of the present invention. Any names with similar functions should be regarded as equal to the names used in the embodiments of the present invention, and therefore are in the scope of protection of present application.

It should be understood that the technical solutions of the present invention can be applied to various communications systems, e.g.: a long term evolution, LTE, system, an evolved LTE system, eLTE, $5^{th}$ generation mobile/wireless communication system, 5G, and wireless communications system beyond 5G.

It should further be understood that in the embodiments of the present invention, user equipment, UE, may be referred to as a terminal, terminal device, a mobile station, MS, a mobile terminal, or the like. The UE may communicate with one or more core networks through a radio access network, RAN, or communicate with other UEs through D2D communication. For example, the UE may be a mobile phone (also referred to as a "cellular" phone) or a computer with a mobile terminal. For example, the UE may also be a portable, pocket-sized, handheld, wearable, computer built-in, or in-vehicle mobile apparatus, which exchanges voice and/or data with the radio access network.

In the embodiments of the present invention, a base station, BS, may be a base transceiver station, BTS, or an evolved Node B (eNB or e-NodeB) in LTE or eLTE, or next generation Node B, gNB, or integrated access & backhaul, IAB, node, or access node in a wireless network, or may be a device that has a similar function with a base station and that is in a wireless network in the future, which is not limited in the present invention. For ease of description, a BS and UE are used as examples for description in the following embodiments; however, the method described in the present invention may also be similarly applied to communication between other entities (for example, a terminal and another terminal).

The present embodiments of the invention have been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

FIG. 1 shows a system supporting D2D communication. In FIG. 1, the system comprises network device 110 e.g. the network device may be gNB or eNB. The coverage of the network device may be 112 as shown in FIG. 1. In the embodiments of this invention, network device is used to indicate any access point e.g. BS in a wireless/mobile network. The coverage of the network device indicates the area in which a UE may receive or detect the signal sending by the network device 110.

UE 120, UE 122 and UE 124 may access the network through the network device 110. As shown in FIG. 1, UE 120 and UE 122 are in the coverage of the network device 110. UE 120 and UE 122 access the network device through the cellular link 113 and 115 separately. UE 120 and UE 122 may also communicate with each other through a direct D2D communication channel 121.

UE 124 in FIG. 1 may use direct D2D communication channel 123 and 125 to access UE 120 and UE 122 respectively. The direct D2D communication channels 121, 123 and 125 are also called sidelink, e.g. sidelink 121, sidelink 123 and sidelink 125 etc. The communication over the sidelink 121 for D2D communication may be controlled by the network device 110, while the communication over sidelink 123 and 125 may not be controlled by network device 110.

In order to ease the description of the present disclosure, some concepts are defined or explained as below:

Cellular link: cellular link comprises the links between UE(s) and network device(s). For example, the radio link between UE and gNB/eNB. Link or radio link is a communication channel which can be used to communicate between any devices.

Sidelink: sidelink means the link(s) used for direct D2D communication. The sidelink may or may not be controlled by the network device. V2V communication is also a special case of D2D communication.

DRX: discontinuous reception on cellular link and/or sidelink in order to save energy of UE. For UE configured with DRX, the UE may turn off the transceiver when the UE enters off mode and the transceiver is turn on during on duration. Different types of duration can be configured, e.g. short cycle, long cycle etc.

DRX mode: DRX mode means UE wakes up periodically to monitor the cellular links or sidelinks (e.g. during on duration) when there is not continuous data transmission. The UE may comprise short DRX cycle and/or long DRX cycle, and the short DRX cycle and long DRX cycle may have different DRX cycles (or different period).

Idle mode: a UE in idle mode may support public land mobile network (PLMN) selection, receiving of system information, cell re-selection mobility, paging or notification detection etc. Idle mode also called idle state.

Inactive mode: a UE has no radio bearer established over the radio link, but the network device, e.g. gNB, may reserve the context of the UE. The bearer for the UE between the network device and core network (CN) may be kept. Inactive mode may also be called inactive state.

Connection mode: a UE is in connection mode when it has data exchanging with network and support network controlled mobility as well as measurement etc. The data exchange may through cellular link or sidelink. Connection mode may also called connection state or active state or active mode.

Sleep mode: a UE in sleep mode turns off the transceiver/antenna and there is no date communication on any cellular link or sidelink.

Figure 2:
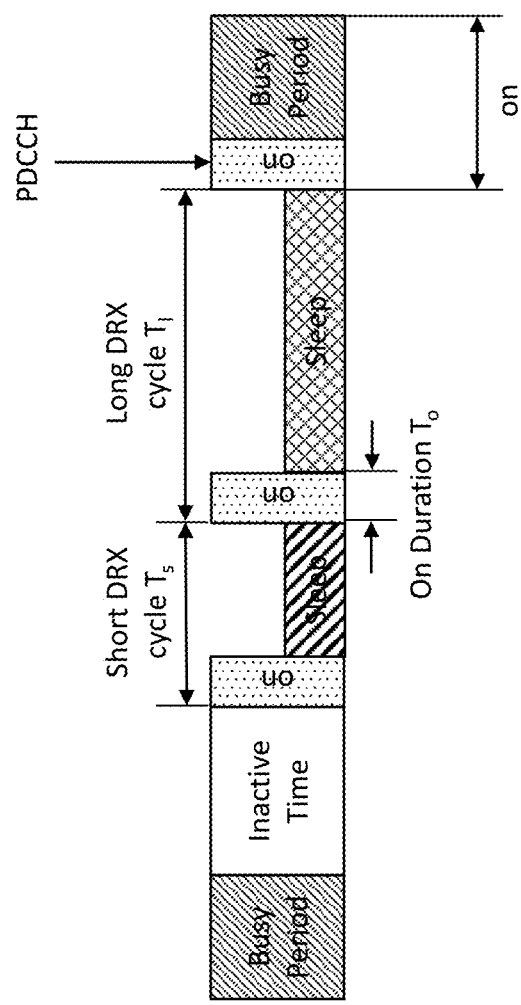
FIG. 2 shows the DRX operation for a UE in connected mode.

FIG. 2 shows the DRX operation for a UE in connected mode. It should be understood that the embodiments of this invention use one UE as example and a plurality of UEs may work in DRX mode. The UE is in the connection mode, and the UE is prepared for an active communication via the network device. If there is no data transmission for a certain period, for example "inactive time" in FIG. 2, the UE will turn into the sleep mode in which monitoring process over cellular link and/or sidelink of the UE are stopped for a certain period, as well as data transmission/reception.

In FIG. 2, the UE wakes up from the sleep mode in the on duration in order to monitor the control information from the network device/UE(s). If there is no request to start an active data transmission or reception, the UE will turn to the long DRX cycle after short DRX cycle. If message(s) via physical downlink control channel, PDCCH, is received during on duration, the UE will switch to busy period. The UE will receive data or signaling from network device/UE(s) during busy period. The on duration after the inactive time may not be necessary because the UE keeps monitoring the channel between the network device/UE(s) and the UE during the inactive time. The (short) DRX cycle may start from the beginning of the on duration as shown in FIG. 2.

FIG. 2 shows only one short DRX cycle, but multiple short DRX cycles may be configured. If multiple short DRX cycles are configured, another short DRX cycle timer may be configured, and the duration of the short DRX cycle timer may be multiple times of the duration of a short DRX cycle. The short DRX cycle timer counts the number of short DRX cycles that need to be operated.

The duration of inactive time $T_i$, short DRX cycle $T_s$, on duration time $T_o$, long DRX cycle $T_l$, together with other parameters which impact the DRX process, may either be pre-configured and stored in the UEs, or be distributed and updated by local network device via control channel over the cellular link, or obtained via sidelink broadcast/dedicate channel.

In one possible implementation, the duration of inactive time $T_i$ may be configured with a DRX inactivity timer. Short DRX cycle $T_s$ may be configured with specific values, e.g. 1 millisecond (ms), 2 ms or any possible value. The on duration time $T_o$ may be configured with an on duration timer. The configuration of Long DRX cycle may include start offset and/or the length of long DRX cycle, wherein the length of long DRX cycle may be in millisecond and start offset may be in multiples of 1 millisecond. If short DRX cycle is configured, the length of long DRX cycle may be a multiple of the length of short DRX cycle.

Figure 3:
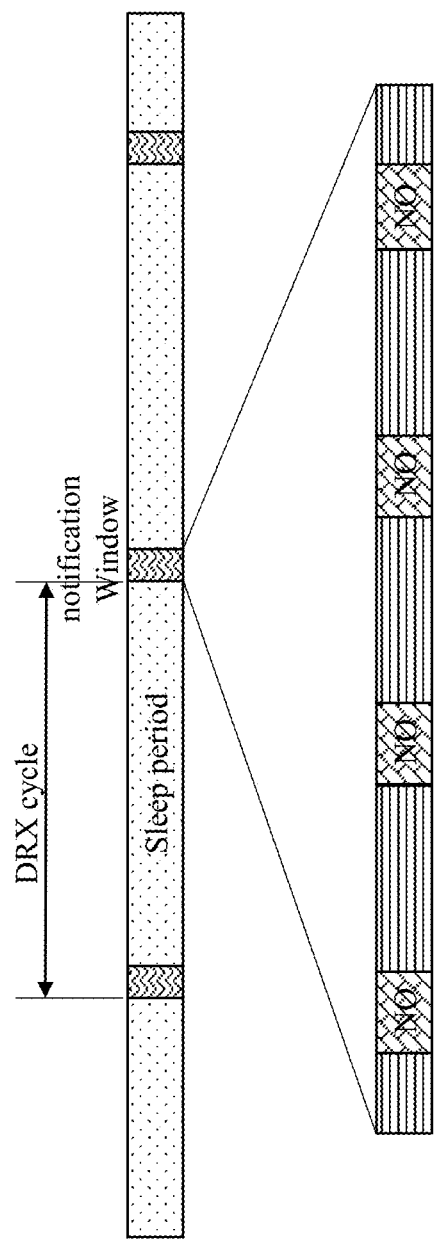
FIG. 3 shows DRX operation for UE in inactive mode or idle mode.

FIG. 3 shows DRX operation for UE in inactive mode or idle mode. When UE is in the inactive mode or the idle mode, it senses or decodes signal over the cellular link or sidelink only in the notification window as shown in FIG. 3. The notification window may also be called notification frame.

One or more notification occasions (NOs) may be configured within one notification frame, and a UE may determine or be configured to monitor some specific notification occasion(s) in one notification window. The notification windows are configured with some specific periodicity, e.g. DRX cycle as shown in FIG. 3.

In LTE or current 5G system, DRX mechanism is enabled on the cellular link between UE and network device. With the development of 5G, DRX mechanism for sidelink is under consideration, but no further details of how to enabling the DRX mechanism over the sidelink.

For sidelink DRX, at least the following scenario should be considered:

When the UE is inside the coverage of the network device and the sidelink is controlled by the network device, which can be called as sidelink transmission mode 1 (or mode 1 for simplicity in the present disclosure) or network scheduled mode in 3GPP.

When the terminal device is outside the coverage of the network device or the sidelink is not fully controlled by the network device, which is called sidelink transmission mode 2 (or mode 2 for simplicity in the present disclosure) or distributed scheduling mode.

It is possible that future UE may have separate antenna/chipset for cellular link and sidelink. For sidelink mode 1, the cellular link and sidelink may work on different frequency bands. In this case, separate DRX configuration parameters may be configured for cellular link and sidelink.

On the other hand, how to coordinate the sidelink DRX configuration parameters for different UEs should be addressed in order to achieve better energy efficiency. Configuration of a separate set of sidelink DRX parameters will require additional signaling overhead. The reduction of such signaling overhead should be considered.

For sidelink mode 2, transmission/reception on the sidelink is not aligned by a center entity, e.g. base station. If each UE runs its sidelink DRX process individually, a transmitting UE may not be aware of the on/off status of its targeting receiving UE therefore the transmitted message may not be received properly. If all UEs share a common time window for transmission or reception, it may lead to collision when multiple UEs transmit data simultaneously.

In order to address the problems above, the embodiments of this invention provide method and process for sidelink DRX configuration for both sidelink mode 1 and sidelink mode 2. The method for sidelink DRX operation in a first UE comprising: receiving, by the first UE, a first set of DRX configuration parameters from the network device, wherein the first set of DRX configuration parameters comprises: a set of cellular link DRX configuration parameters between the first UE and the network device, and a first set of sidelink DRX configuration parameters for D2D communication; operating, by the first UE, in DRX mode on the sidelink communication according to the first set of sidelink DRX configuration parameters.

It should be understood that the "first", "second" and "third" in the embodiments of the present invention are used for differentiation of different objects. For example, a first UE may be the UEs which are in the coverage of the network device and controlled by the network device, and a second UE may be the UEs which are out the coverage of the network device and/or not fully controlled by the network device. The first UE and the second UE may include a plurality of UEs. The same for "third UE". Another example is "a first set of DRX configuration parameters" and "a second set of DRX configuration parameters", the first set of DRX configuration parameters and the second set of DRX configuration parameters may have not much difference and may be used for differentiation of different interface.

Figure 4:
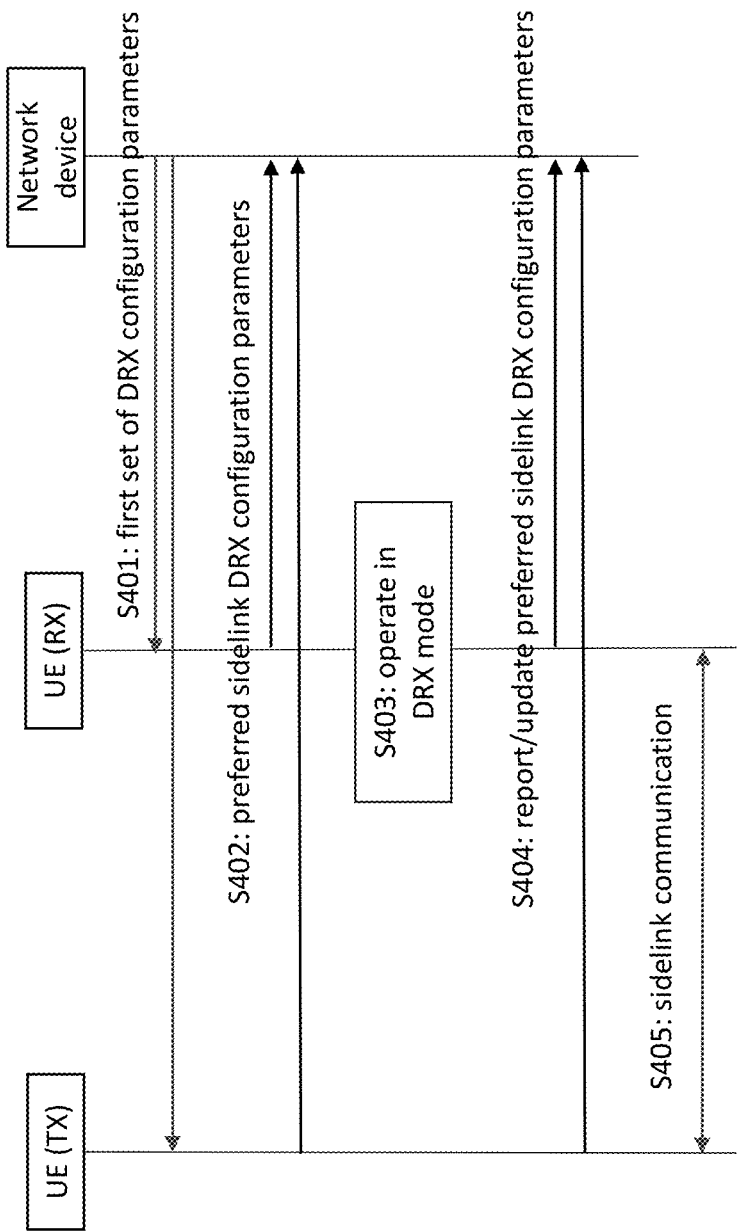
FIG. 4 shows a procedure for DRX configuration for sidelink mode 1.

FIG. 4 shows the procedure for DRX configuration for sidelink mode 1. In FIG. 4, both receiving UE (RX UE) and transmitting UE (TX UE) are in the coverage of the network device. It should be understood that each step in FIG. 4 may be optional and the sequence of the steps may not be followed strictly. For example, steps S402 and S403 may be exchanged. The procedure of FIG. 4 is as following:

S401: the network device sends the first set of DRX configuration parameters to UEs. The UEs include RX UEs and TX UEs. RX UEs may be the UEs which receive signal or data from TX UEs over the sidelink. TX UEs may be the UEs which send signal or data to RX UEs over the sidelink.

The first set of DRX configuration parameters comprises: a set of cellular link DRX configuration parameters between the first UE and the network device, and a first set of sidelink DRX configuration parameters for device to device, D2D, communication.

The "signal" in the embodiments of the present invention may be physical signals received communication channel, or may be the message received over control channel. The UEs receiving the signals may decode the signal in order to obtain the content included in the signals.

S402: the UE may send preferred sidelink DRX configuration parameters to the network device, wherein the preferred sidelink DRX configuration parameters indicate confirmation of the received DRX configuration parameter.

It should be understood that the preferred sidelink DRX configuration parameters may be included in some other message, e.g. a first set of DRX configuration parameters response which further comprises the preferred sidelink DRX configuration parameters. The UE may be the RX UE or the TX UE.

In one possible implementation, it may be valuable to send a preferred sidelink DRX configuration parameters to the network device because the network device may not configure an accurate DRX configuration parameters for the UE considering the mobility state, energy status etc. By indicating preferred sidelink DRX configuration parameters to the network device may improve the energy efficiency.

It should be understood that, if a set of DRX configuration parameters is used in the embodiments of the present invention, it may include the set of cellular DRX configuration parameters and/or the set of sidelink DRX configuration parameters. If "DRX configuration parameters" is used in the embodiments of this invention, it may mean the parameter(s) in the set of cellular DRX configuration parameters and/or the set of sidelink DRX configuration parameters.

S403: the UE (RX UE or TX UE) operates in DRX mode. The operation of DRX is based on the first set of DRX configuration parameters. The DRX operation comprises the cellular link DRX operation and/or sidelink DRX operation. Step S403 may be activated before step S402.

S404: the UE (RX UE or TX UE) may report/update the preferred sidelink DRX configuration parameters. If the UE wants to change the preferred sidelink DRX configuration parameters, it may send the updated sidelink DRX configuration parameters.

S405: the UE may communicate with other UEs nearby over sidelink using the first set of sidelink DRX configuration parameters. The UE may transmit or receive a first signal and/or a first data over the sidelink.

In a possible implementation, the UE may report the preferred sidelink DRX configuration parameters actively to the network device after the UE connecting to the network device at the first time, which can ease the configuration of the first set of DRX configuration parameters and reduce signaling overhead because the preferred sidelink DRX configuration parameters may be considered by the network device to optimize the configuration.

The UE may report/update the preferred sidelink DRX configuration parameters at any possible time if the status, e.g. mobility, remaining power etc. changed. So, the step S404 may be activated before step S401.

More details of the above steps will be described as below.

In Step S401:

The first set of sidelink DRX configuration parameters comprise delta configuration information, wherein the delta configuration information indicates a differential quantity relative to the set of cellular link DRX configuration parameters.

The set of cellular link DRX configuration parameters comprises at least one of: DRX inactivity timer, short DRX cycle, short DRX cycle timer, on duration timer, long DRX cycle, or long DRX start offset.

The DRX inactivity timer may be configured with a certain value for counting the duration of inactive time. The short DRX cycle timer may be the number of short DRX cycle to be operated. The on duration timer may be the duration of the on status. The configuration of long DRX cycle may also be specified as "longcyclestartoffset", which comprises the length of the long DRX cycle and start offset which defines the subframe where the long and short DRX cycle starts. Wherein start offset may be defined in a similar way as in the prior art of cellular link DRX and will not elaborate here.

The cellular link DRX configuration parameters may further comprise one or more of:
- Slot offset may be the delay before starting the on Duration Timer.
- Retransmission timer downlink (DL) may be the maximum duration until a DL retransmission is received.
- Retransmission timer uplink (UL) may be the maximum duration until a grant for UL retransmission is received.
- Hybrid automatic repeat request (HARQ) round trip time (RTT) timer DL may be the minimum duration before a DL assignment for HARQ retransmission is expected by media access control (MAC) entity.
- HARQ RTT timer UL may be the minimum duration before a UL HARQ retransmission grant is expected by the MAC entity.

In order to coordinate the DRX operation among the sidelinks and achieve better energy efficiency, it is better to align the sidelink DRX configuration parameters of different UEs. On the other hand, the signaling overhead should be minimized.

To achieve the object above, delta configuration is considered. The first set of sidelink DRX configuration parameters may be determined using the set of cellular link DRX configuration parameters and the delta configuration parameters. The delta configuration parameters indicate a differential quantity of the set of sidelink DRX configuration parameters relative to the set of cellular link DRX configuration parameters.

The differential quantity may be proportional to the set of cellular link DRX configuration parameters, or the differential quantity may be the difference to the cellular link DRX configuration parameters, or the differential quantity may be hybrid configuration of proportion and difference. The details of different configurations are described as below.

In one possible implementation, the first set of sidelink DRX configuration parameters may be proportional to the set of cellular link DRX configuration parameters. The proportion may be set for the set of sidelink DRX configuration parameters.

For example, the DRX inactivity timer, short DRX cycle, short DRX cycle timer, on duration timer, long DRX cycle may form a set of sidelink DRX configuration parameters. The DRX inactivity timer, short DRX cycle, short DRX cycle timer, on duration timer, long DRX cycle of the sidelink DRX configuration parameters may be set proportional to the same parameters of the set of cellular link DRX configuration parameters. The differential quantity in this case may be called "group zooming" in the embodiment of the present invention.

The differential quantity may be set to, e.g. 0.1, 0.2, 0.3, 0.4, 0.5, 0.6. 0.7, 0.8, 0.9, 1.0, 1.1, 1.2, 1.3, 1.4, 1.5, 1.6, 1.7, 1.8, 1.9, 2.0. The differential quantity may be smaller or larger than 1 or equal to 1. The value of the differential quantity here should not be considered as limiting in the embodiment of this invention.

Figure 5:
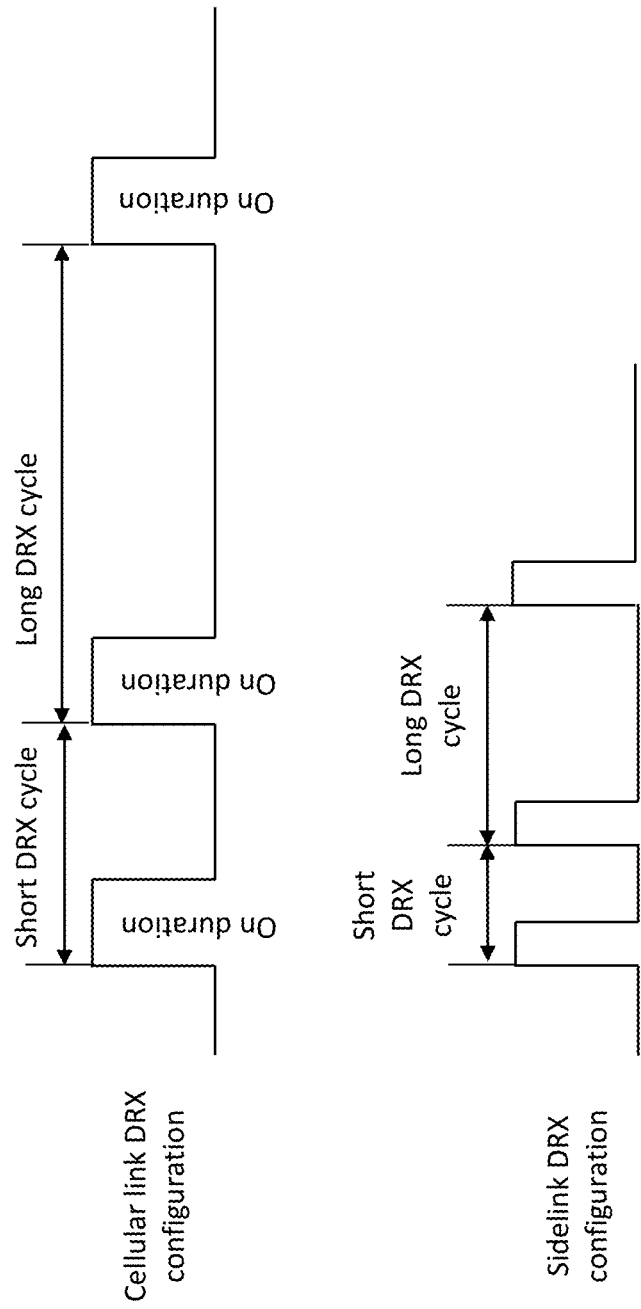
FIG. 5 shows an example of group zooming configuration for the set of sidelink DRX configuration.

FIG. 5 shows an example of group zooming configuration for the set of sidelink DRX configuration parameters. The set of sidelink DRX configuration parameters is half of the set of cellular link DRX configuration parameters. The parameters which are included in the "group zooming" may be predefined or pre-configured.

By using the group zooming for the set of sidelink DRX configuration, the overhead will be greatly reduced and only multiple bits would be enough for a set of sidelink DRX configuration parameters, e.g. 2 or 3 bits may be enough for the set of sidelink DRX configuration parameters. It should be understood that the differential quantity may be smaller or larger than 1. The differential quantity in this case presents the ratio of a set of sidelink DRX configuration parameters and a set of cellular link DRX configuration parameters as described above.

It should be understood that the ratio may be achieved by some specific DRX parameter in the set of sidelink DRX configuration parameters and the set of cellular link DRX configuration parameters for "group zooming" case.

In one possible implementation, the proportion may be set for each sidelink DRX configuration parameter in the set of sidelink DRX configuration parameters individually, and different parameters of the set of sidelink DRX configuration parameters may be set to different ratios (or different differential quantities) separately according to the requirements or implementation.

Figure 6:
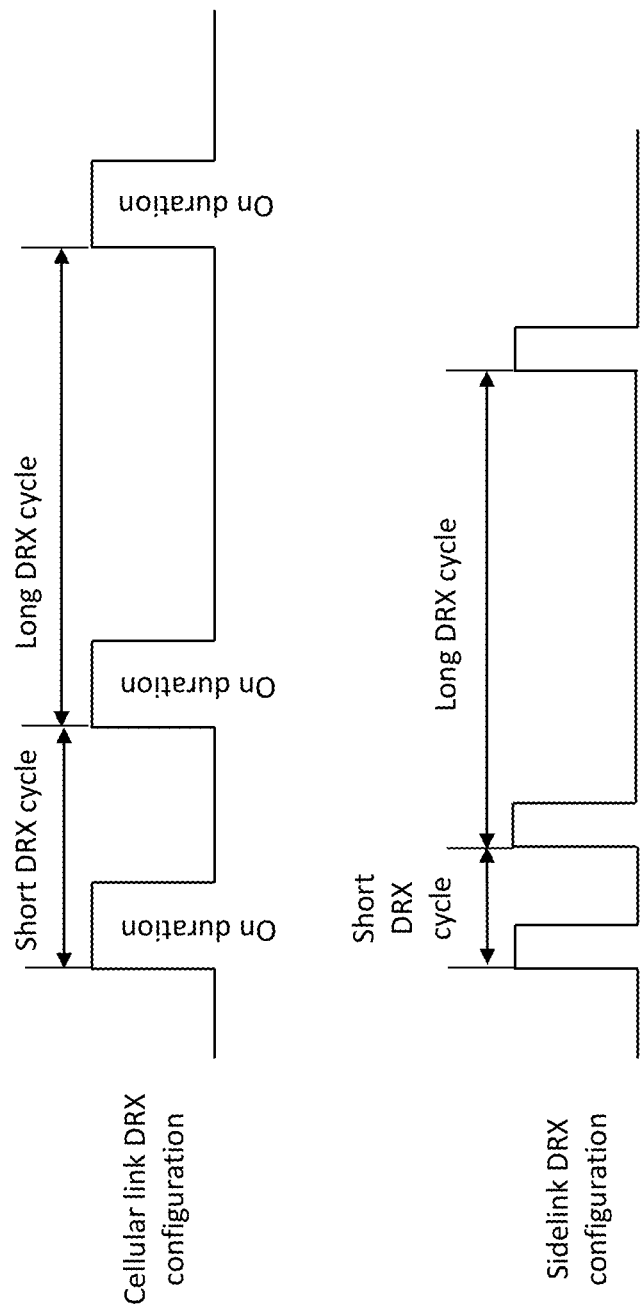
FIG. 6 shows different differential quantities for different sidelink DRX configuration parameters.

FIG. 6 shows different differential quantities for different sidelink DRX configuration parameters. In this example, the duration of on duration of the sidelink DRX configuration parameters is half of the duration of on duration of the cellular link DRX configuration parameters. The short DRX cycle of the sidelink DRX configuration parameters is half of the short DRX cycle of the cellular DRX configuration parameters. The long DRX cycle of the sidelink DRX configuration parameters is the same as the long DRX cycle of the cellular DRX configuration parameters.

The differential quantity for this case as shown in FIG. 6 may be called "individual zooming" in the embodiments of the present invention. The parameters which are included in the "individual zooming" may be predefined or pre-configured.

By using the individual zooming for the set of sidelink DRX configuration parameters, the overhead will be greatly reduced compared to full configuration. Full configuration means configuring the value of each sidelink DRX configuration parameter independent of the cellular link DRX configuration. Only several bits would be enough for each parameter of the sidelink DRX configuration, e.g. 2 or 3 bits may be enough for each parameter of the sidelink DRX configuration. It should be understood that the differential quantity may be smaller or larger than 1 or equal to 1. The individual zooming may make the configuration more flexible while keeping low signaling overhead. The individual zooming may also further reduce the power consuming by shrinking the short DRX cycle while keeping or extend the long DRX cycle.

In one possible implementation, the differential quantity may be the difference to the set of cellular link DRX configuration parameters. Using the difference to present the sidelink set of DRX configuration parameters may be possible. For example, the long DRX cycle of the set of cellular link DRX configuration parameters is 640 millisecond (ms), and long DRX cycle of the set of sidelink DRX configuration parameters is 1024 ms, the difference will be 640 ms and a special code may be used to indicate the difference. The code of the difference depends on the implementation and the embodiment of the present invention will not restrict the implementation. By using the coding of the difference, the signaling overhead may be reduced.

In one possible implementation, "group zooming" and "individual zooming" may be used simultaneously. For example, some parameters of the set of sidelink DRX configuration parameters may use group zooming, e.g. short DRX cycle and long DRX cycle, while on duration timer using individual zooming.

In one possible implementation, the differential quantity may be hybrid configuration of proportion and difference. For example, on duration timer of the set of sidelink DRX configuration parameters may be configured using proportion, while long DRX cycle may be configured using difference.

In order to support different types of configuration, the delta configuration information comprises at least one of: group indicator, type indicator, or value of delta.

Group indicator may indicate the differential quantity is group zooming or individual zooming or hybrid. The group indicator may be e.g. 1 or 2 bits which depends on the implementation requirements. 0 may be group zooming and 1 may be individual zooming. Group indicator may make different type of configuration flexible and reduce the signaling overhead.

Type indicator may indicate whether the differential quantity is defined as proportion or difference if hybrid configuration is used. Type indicator may make different type of configuration flexible and reduce the signaling overhead.

Value of delta is the value of proportion or differential relative to the value of cellular link DRX configuration parameters. If the differential quantity is "group zooming", the value of delta may not be needed. The value of delta is only needed for the case of difference configuration.

In Step S402:

The preferred sidelink DRX configuration parameters may be an indication of successful receiving and/or applying the first set of DRX configuration parameters in the UE. For example, 1 bit may be used to indicate the successful receiving and/or applying the first set of DRX configuration parameters.

It is possible that the first set of DRX configuration parameters, in particularly the set of sidelink DRX configuration parameters are not suitable for the status of the UE, e.g. the power status or the mobility state of the UE. For instance if the UE is in a high mobility state, longer on duration timer or shorter DRX cycle may be more suitable. In this case, the UE may send the preferred sidelink DRX configuration parameters to the network in order to achieve better quality of communication.

The preferred sidelink DRX configuration parameters may be proportional or differential relative to the received set of sidelink DRX configuration parameters. The method of the preferred sidelink DRX configuration parameters is the same as step S401 described above and will not be elaborated again.

In Step S404:

The UE may update the preferred sidelink DRX configuration parameters at any time. The update of the preferred sidelink DRX configuration parameters may be based on the previous sidelink DRX configuration parameters. The previous sidelink DRX configuration parameters may be configured by the network device, or may be the previous sidelink DRX configuration parameters updated by the UE actively.

The method of the preferred sidelink DRX configuration parameters in step S404 may be similar as step S401 described above and will not be elaborated again. The preferred sidelink DRX configuration parameters may be a full configuration, and the full configuration means configuring each value of DRX parameters independent of the cellular DRX configuration parameters.

In one possible implementation, the UE may report preferred sidelink DRX configuration parameters at any time. In particularly, the report may be send to the network device when the UE access the network device at the first time, e.g. after registration to the network. The report preferred sidelink DRX configuration parameters may be before the step S401.

Based on the embodiment of FIG. 4, the signaling overhead of the set of sidelink DRX configuration parameters may be reduced and simplified. A set of optimal sidelink DRX configuration parameters may be configured by providing the UE's preferred sidelink DRX configuration parameters to the network device.

In one possible implementation, after receiving the first set of DRX configuration parameters from the network device, the first UE may not activate the DRX and waiting for activation command from the network device. The first UE may receive an activation command from the network device, wherein the activation command is used to activate or change the first set of sidelink DRX configuration parameters which may change the sidelink DRX operation state.

The activation command may also be used to change the state of the current DRX operation. The activation command may also be an update message send by the network device to the first UE for updating the sidelink DRX operation state. For example, when the sidelink is operating in DRX mode, the activation command may request the UE switch to a continuous reception state. Continuous reception state may be the UE receives signal/data on the sidelink continuously and DRX operation is interrupted.

This activation command may include the message to make the Rx UE be prepared for the sidelink communication, e.g. exit the sleep mode or exit the DRX procedure.

If a TX UE wants to communicate with the other UE(s), e.g. RX UE, over the sidelink, the TX UE may send the sidelink communication request to the network device. The network device will change the sidelink DRX operation of the RX UE by sending the activation command to the RX UE. The activation command may include a set of sidelink DRX configuration parameters of the TX UE in order to align the transmission or reception of the RX UE with the TX UE. The TX UE may be the first UE here.

The first UE may receive the activation command from the network to activate the sidelink DRX of the first UE, and the activation command may include a set of sidelink DRX configuration parameters of the other UE, e.g. TX UE.

When the UE is outside of the coverage of the network device or the sidelink is not fully controlled by the network device, multiple UEs may be assigned to the same notification occasion (NO) as introduced in FIG. 3. Multiple UEs assigning to the same NO will lead to collision. On the other hand, two UEs which are assigned to the same NO can never communicate because they monitor the sidelink simultaneously and may not detect each other.

Figure 7:
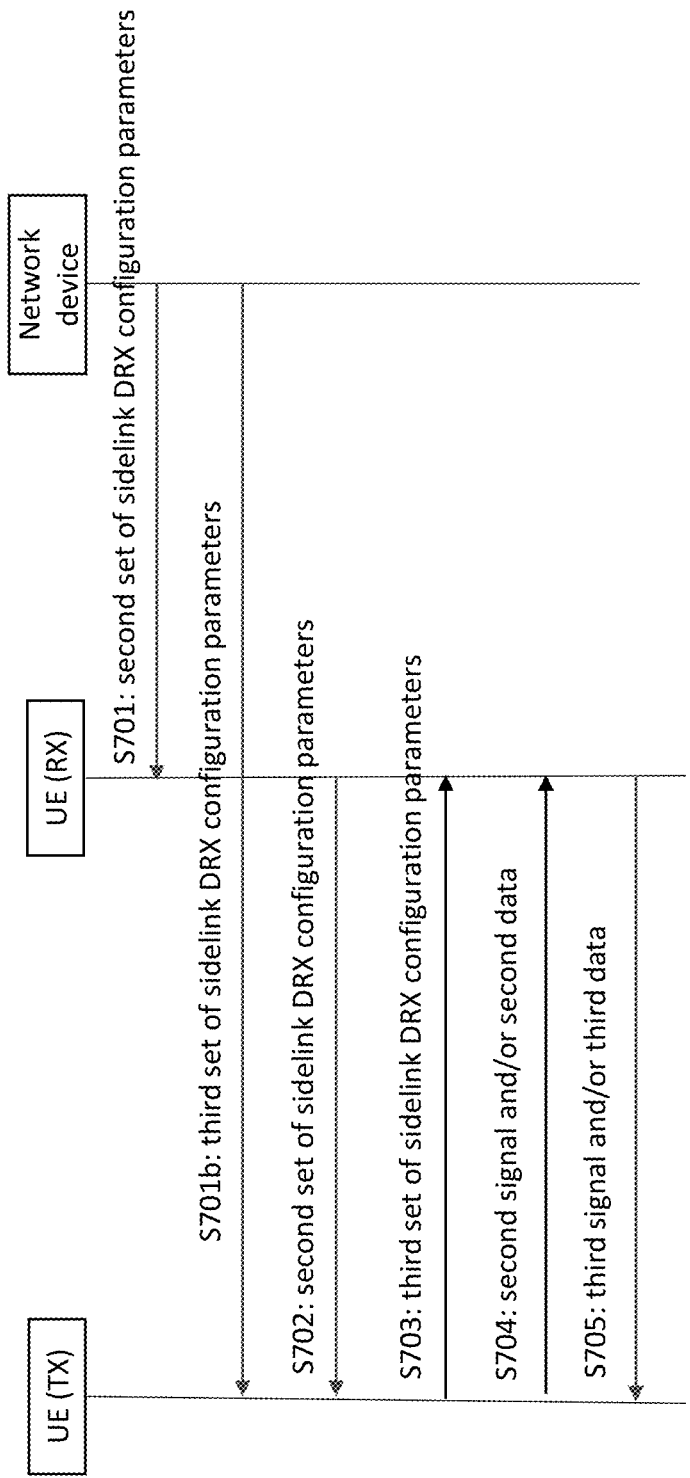
FIG. 7 shows a procedure of sidelink mode 2 for sidelink DRX configuration.

FIG. 7 shows the procedure of sidelink mode 2 for sidelink DRX configuration. The steps in FIG. 7 may be exchanged and the sequence of the messages in FIG. 7 should not be understood as limiting to the embodiment or implementation. The steps are described as below.

S701: the network device may send a second set of sidelink DRX configuration parameters to the RX UE, also called the second UE. The content of the second set of DRX configuration parameters comprises at least one of: identifier (ID) of the RX UE, notification cycle timer, notification frame offset, index of the notification occasion.

UE may receive the configuration of the NO directly in the second set of sidelink DRX configuration parameters. Notification cycle is the duration between two continuous notification windows as introduced in FIG. 3. Notification frame offset may be used to derive the position of notification frames in a notification cycle. The index of the NO indicates the subframe in which UE receives notification. It should be understood that multiple indexes may be included in the second set of sidelink DRX configuration parameters if multiple notification occasions are configured.

The ID of the RX UE may be any type of ID of the UE, e.g. radio network temporary identifier (RNTI), or MAC address, or international mobile subscriber identity (IMSI) etc.

Step S701 is optional, and RX UE is configured with the second set of sidelink DRX configuration parameters only when the RX UE is in the coverage of network device. In one possible implementation, the second set of sidelink DRX configuration parameters may be preconfigured by vendor of the RX UE or defined by standard. It can be configured by dedicate or broadcast signaling which is out of the scope of the embodiments of the present invention.

The second UE may configure more than one NOs in order to avoid collision with other UEs which may assign a same NO as the second UE. By assigning more than one NOs, the collision may be avoided if at least one NO is different between two UEs. If more than one NOs in the first set of notification windows are configured, more than one index of the NO may be configured.

Step S701b is similar with S701 and the difference is that the network device sends the third set of sidelink DRX configuration parameters to a TX UE, and the TX UE is called third UE in the embodiments of the present invention. The "third" and "second" is only for differentiation as explained at the beginning of the present disclosure.

It should be understood that, the UE in the embodiments of the present invention may be any of the first UE, the second UE, or the third UE in different scenarios.

S702: the second UE sends the second set of sidelink DRX configuration parameters to the third UE, wherein the second set of sidelink DRX configuration parameters comprise the configuration of a first set of notification windows, wherein the set of first notification windows indicate the opportunities of receiving/transmitting signal/data by the second UE. The second set of sidelink DRX configuration parameters may be generated locally or be obtained from the network device as S701.

The second UE may send the second set of sidelink DRX configuration parameters during the discovery procedure which may use any discovery procedure in the prior art. During the discovery procedure, the RX UE sends the second set of sidelink DRX configuration parameters of its own to other UEs, and it will monitor at the notification windows of the second set of sidelink DRX configuration parameters.

S703: the third UE sends the third set of sidelink DRX configuration parameters over the sidelink, wherein the third set of sidelink DRX configuration parameters comprise the configuration of a second set of notification windows, wherein the second set of notification windows indicate the opportunities of receiving/transmitting signal/data by the third UE.

It should be understood that the first set of notification windows and the second set of notification windows may comprise one or more notification windows.

The third set of sidelink DRX configuration parameters are send to the UEs nearby during the discovery procedure. S703 is similar with S702, and the "third" is used to differentiate the message is send by the third UE, e.g. the TX UE.

Based on S702 and S703, the second UE and the UEs nearby may obtain the set of sidelink DRX configuration parameters of other UEs. Each UE will monitor the communication channel which is send to the UEs nearby. The determining of the NO may base on some specific algorithm similar as paging in the prior art. Due to a plurality of NOs are configured, the collision probability will be greatly reduced.

For example, the first set of notification windows may be calculated as below:

$$(SFN+NF\_offset) \bmod T = (T \text{ div } N_N) * (UE\_ID \bmod N_N)$$

Index $i_s$, indicating the index of the NO is determined by:

$$i_s = \text{floor}(UE\_ID/N_N) \bmod N_s$$

wherein the SFN is the system frame number, NF_offset is the offset of the notification frame, T is the length of notification cycle, $N_N$ is the number of notification frames in one notification cycle, is indicates the index of the NO, $N_s$ is the notification number in one notification frame, UE_ID is the UE ID. If multiple NOs in the first set of notification windows are configured, multiple is should be configured in the second set of sidelink DRX configuration parameters.

The second set of notification windows may be the NOs applied by the third UE.

S704: the second UE receives a second signal and/or a second data at the first set of notification windows.

The second UE monitors at the first set of notification windows (NOs) periodically based on the DRX configuration in S702. If multiple first set of notification windows are configured, the second UE will monitor multiple first set of notification windows.

In order to guarantee the second UE may receive the second signal and/or the second data at the first set of notification windows, the second signal and/or the second data comprise the identifier of the second UE.

In a possible implementation, the second UE may receive signal at the first set notification windows, and the signal indicates may comprise an indication of further transmission over the sidelink. The indication may comprise the time-frequency resource of the further transmission. The time domain resource may be predefined or indicated in the indication explicitly.

In a possible implementation, the second UE may sense signal at the first set of notification windows. The sensing at the first set notification windows may base on the receiving power at the second UE. Furthermore, if the receiving power is over certain threshold and decoding failed, the second UE may assume the other UE may want to communicate with it. In this case, the second UE may continue to detect/monitor the subframes/slots for some duration because the other UE may retransmit in the following subframes/slots. If the second UE monitors the coming subframes/slots, the UE may not miss the transmission and increase the success probability of data transmission.

S705: if the second UE needs to send a third signal or a third data to the third UE, the second UE sends the third signal or the third data to the third UE based on the received set of sidelink DRX configuration parameters of the third UE.

In order to guarantee the third UE may decode the third signal and/or the third data at the second set of notification windows, the third signal and/or the third data comprise the identifier of the third UE.

The embodiments described above present the method, process among different network elements, e.g. the first UE, the second UE, the third UE, the network device etc. It should be understood that the each network element may include one or more hardware structure or software module/unit in order to implement the method/process described above.

The person skilled in the art will understand that the functionalities provided in the methods/processes of the embodiments of the present invention may be implemented in the form of hardware and/or software. The functionalities provided in the embodiments of the invention are implemented in hardware or software depends on the specific application and design restriction/consideration.

The person skilled in the art may use different method(s) to implement the functionality/functionalities described in the embodiments of the invention, but the implementation should not be considered as out of the scope of the protection of the present application. This application will not restrict the implementation in hardware/software which may comprise one or more steps/functionalities in the method embodiments.

Figures 8A, 8B:
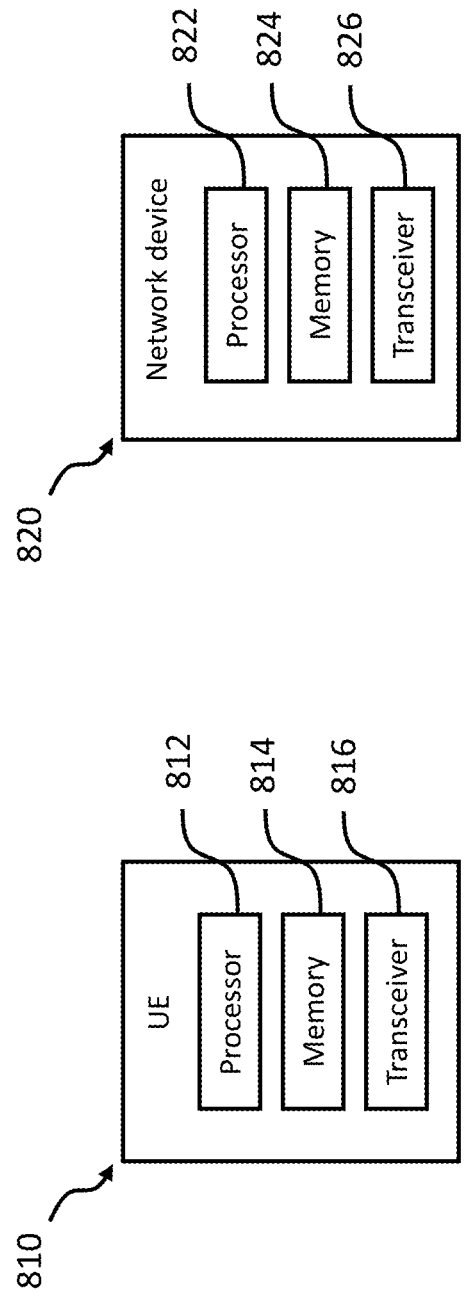
FIG. 8a shows a schematic diagram illustrating components of the UE.
FIG. 8b shows a schematic diagram illustrating components of the network device.

FIG. 8a shows a schematic diagram illustrating components of the UE 810 according to embodiments in the present invention. The UE may be the first UE, the second UE and the third UE. The UE 810 illustrated in FIG. 8a comprises a processor 812 for data processing, controlling/managing of the UE, a non-transitory memory 814 for storing and retrieving data, and a transceiver 816 for communicating over radio link which may include cellular link with the network device or sidelink with other UE(s) nearby. The processor 812 may also be used for executing the program code stored/retrieved from the non-transitory memory 814.

It should be understood by the person skilled in the art that the UE may also include e.g. a bus which is used for internal communication among the processor 812, the non-transitory memory 814 and the transceiver 816, or some other necessary hardware.

The processor 812 may comprise digital circuitry, or both analog and digital circuitry. Digital circuitry may comprise components such as application-specific integrated circuits (ASICs), field-programmable arrays (FPGAs), digital signal processors (DSPs), or general-purpose processors.

The non-transitory memory 814 may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the UE 810 may further comprises the necessary communication capabilities in the form of e.g., functions, means, units, elements, etc., for performing the solution. Examples of other such means, units, elements and functions are: buffers, control logic, encoders, decoders, inputs, outputs, antennas, amplifiers, receiver units, transmitter units, DSPs, MSDs, TCM encoder, TCM decoder, power supply units, power feeders, communication protocols, etc. which are suitably arranged together for performing the solution.

The non-transitory memory 814 may store executable program code which, when executed by the processor 812, causes the UE 810 to perform the functions and methods described in the present disclosure. The transceiver 816 may comprise one or more antennas and/or transmission ports for data transmission/reception, for instance, with the network device and/or the other UEs.

Any one of the processor 812, the non-transitory memory 814 and the transceiver 816 may be implemented in a chipset. In another possible implementation, any two of the processor 812, the non-transitory memory 814 and the transceiver 816 may be integrated together in a chipset, e.g. the processor 812 and the non-transitory memory 814 may be integrated in a chipset. In another example, the processor 812, the non-transitory memory 814 and the transceiver 816 may be integrated in a chipset.

As an example but not limiting, the processor 812 may be used to execute the step S403 signal/data processing, or any control/management in the UE in the embodiment as shown in FIG. 4. The processor 812 may also be used to execute signal/data processing, or any control/management in the UE in the embodiment as shown in FIG. 7. The transceiver 816 may be used to execute the steps S401, S402, S404, S405, signal/data processing in the embodiment as shown in FIG. 4. The transceiver 816 may also be used to execute the steps S701, S701b, S702, S703, S704, S705, signal/data processing in the embodiment as shown in FIG. 7.

FIG. 8b shows a schematic diagram illustrating components of the network device according to embodiments in the present invention. The network device 820 illustrated in FIG. 8b comprises a processor 822 for data processing, controlling/managing of the network device, a non-transitory memory 824 for storing and retrieving data, and a transceiver 826 for communicating over radio link which may include cellular link. The processor 822 may also be used for executing the program code stored/retrieved from the non-transitory memory 824.

It should be understood by the person skilled in the art that the network device may also include e.g. a bus which is used for internal communication among the processor 822, the non-transitory memory 824 and the transceiver 826, or some other necessary hardware.

The processor 822 may comprise digital circuitry, or both analog and digital circuitry. Digital circuitry may comprise components such as application-specific integrated circuits (ASICs), field-programmable arrays (FPGAs), digital signal processors (DSPs), or general-purpose processors.

The non-transitory memory 824 may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the network device 820 may further comprises the necessary communication capabilities in the form of e.g., functions, means, units, elements, etc., for performing the solution. Examples of other such means, units, elements and functions are: buffers, control logic, encoders, decoders, inputs, outputs, antennas, amplifiers, receiver units, transmitter units, DSPs, MSDs, TCM encoder, TCM decoder, power supply units, power feeders, communication protocols, etc. which are suitably arranged together for performing the solution.

The non-transitory memory 824 may store executable program code which, when executed by the processor 822, causes the network device 820 to perform the functions and methods described in the present disclosure. The transceiver 826 may comprise one or more antennas and/or transmission ports for data transmission/reception, for instance, with the network device and/or the other UEs.

Any one of the processor 822, the non-transitory memory 824 and the transceiver 826 may be implemented in a chipset. In another possible implementation, any two of the processor 822, the non-transitory memory 824 and the transceiver 826 may be integrated together in a chipset, e.g. the processor 822 and the non-transitory memory 824 may be integrated in a chipset. In another example, the processor 822, the non-transitory memory 824 and the transceiver 826 may be integrated in a chipset.

The non-transitory memory 814 may store executable program code which, when executed by the processor 812, causes the UE (the first UE and/or the second UE) to perform the functions and methods described in this disclosure.

The non-transitory memory 824 may store executable program code which, when executed by the processor 822, causes the network device to perform the functions and methods described in this disclosure.

As an example but not limiting, the processor 822 may be used to execute the step S401 signal/data processing, or any control/management in the network device in the embodiment as shown in FIG. 4. The processor 822 may also be used to execute signal/data processing, or any control/management in the network device in the embodiment as shown in FIG. 7. The transceiver 826 may be used to execute the steps S401, signal/data processing in the embodiment as shown in FIG. 4. The transceiver 826 may also be used to execute the steps S701, S701b, signal/data processing in the network device in the embodiment as shown in FIG. 7.

A computer program product is provided comprising a non-transitory computer-readable storage medium carrying program code which causes a computer or a processor to perform the method according to the method according to the first UE or the second UE, or perform the method according to the network device when the program code is executed by the computer or the processor.

Finally, it should be understood that the disclosure is not limited to the embodiments described above, but also relates to and incorporates all embodiments within the scope of the appended independent claims.

The invention claimed is:

1. A method for sidelink discontinuous reception (DRX) operation in a first user equipment (UE), comprising:
receiving, by the first UE, a first set of DRX configuration parameters from a network device, wherein the first set of DRX configuration parameters comprises: a set of cellular link DRX configuration parameters between the first UE and the network device, and a first set of sidelink DRX configuration parameters for device to device (D2D) communication;
operating, by the first UE, in DRX mode on a sidelink communication according to the first set of DRX configuration parameters; and
wherein the first set of sidelink DRX configuration parameters comprises delta configuration information, wherein the delta configuration information indicates a differential quantity relative to the cellular link DRX configuration parameters, wherein the set of cellular link DRX configuration parameters comprises a length of an inactivity timer for cellular link DRX, and wherein the delta configuration information comprises a value of difference between the length of the inactivity timer for cellular link DRX and a length of an inactivity timer for sidelink DRX.

2. The method according to claim 1, the method further comprises:
sending, by the first UE, preferred sidelink DRX configuration parameters to the network device, wherein the preferred sidelink DRX configuration parameters indicate confirmation of the first set of DRX configuration parameter, or the preferred sidelink DRX configuration parameters indicate a set of sidelink DRX configuration parameters preferred by the first UE.

3. The method according to claim 1, the method further comprises:
sending, by the first UE, a report or an update of preferred sidelink DRX configuration parameters to the network device.

4. The method according to claim 1, wherein the set of cellular link DRX configuration parameters comprises at least one of: short DRX cycle, short DRX cycle timer, on duration timer, long DRX cycle, or long DRX start offset.

5. The method according to claim 1, wherein the delta configuration information comprises at least one of: group indicator, type indicator, or value of delta.

6. The method according to claim 1, the method further comprises:
receiving, by the first UE, an activation command from the network device, wherein the activation command activates or changes the first set of sidelink DRX configuration parameters; or,
sending, by the first UE, a sidelink communication request to the network device.

7. A method for sidelink discontinuous reception (DRX) operation in a network device, comprising:
obtaining, by the network device, a first set of DRX configuration parameters;
sending, by the network device, the first set of DRX configuration parameters to a first user equipment (UE), wherein the first set of DRX configuration parameters comprises a set of cellular link DRX configuration parameters between the first UE and the network device, and a first set of sidelink DRX configuration parameters for device to device (D2D) communication; and
wherein the first set of sidelink DRX configuration parameters comprises delta configuration information, wherein the delta configuration information indicates a differential quantity relative to the set of cellular link DRX configuration parameters, wherein the set of cellular link DRX configuration parameters comprises a length of an inactivity timer for cellular link DRX, and the delta configuration information comprises a value of difference between the length of the inactivity timer for cellular link DRX and a length of an inactivity timer for sidelink DRX.

8. The method according to claim 7, the method further comprises:
receiving, by the network device, preferred sidelink DRX configuration parameters from the first UE, wherein the preferred sidelink DRX configuration parameters indicate confirmation of receiving of the first set of DRX configuration parameters, or the preferred sidelink DRX configuration parameters indicate a set of sidelink DRX configuration parameters preferred by the first UE.

9. The method according to claim 7, wherein the set of cellular link DRX configuration parameters comprises at least one of: short DRX cycle, short DRX cycle timer, on duration timer, Long DRX Cycle, or long DRX start offset.

10. The method according to claim 7, wherein the delta configuration information comprises at least one of: group indicator, type indicator, or value of delta.

11. A user equipment (UE), for sidelink discontinuous reception (DRX) operation, comprising:
at least one processor; and
one or more memories coupled to the at least one processor and storing programming instructions for execution by the at least one processor to cause the UE to perform operations comprising:
receiving a first set of DRX configuration parameters from a network device, wherein the first set of DRX configuration parameters comprises: a set of cellular link DRX configuration parameters between the UE and the network device, and a first set of sidelink DRX configuration parameters for device to device (D2D) communication;
operating in DRX mode on a sidelink communication according to the first set of DRX configuration parameters; and
wherein the first set of sidelink DRX configuration parameters comprises delta configuration information, wherein the delta configuration information indicates a differential quantity relative to the cellular link DRX configuration parameters, wherein the set of cellular link DRX configuration parameters comprises a length of an inactivity timer for cellular link DRX, and wherein the delta configuration information comprises a value of difference between the length of the inactivity timer for cellular link DRX and a length of an inactivity timer for sidelink DRX.

12. The UE according to claim 11, wherein the operations further comprise:
sending preferred sidelink DRX configuration parameters to the network device, wherein the preferred sidelink DRX configuration parameters indicate confirmation of the first set of DRX configuration parameter, or the preferred sidelink DRX configuration parameters indicate a set of sidelink DRX configuration parameters preferred by the UE.

13. The UE according to claim 11, wherein the operations further comprise:
sending a report or an update of preferred sidelink DRX configuration parameters to the network device.

14. The UE according to claim 11, wherein the set of cellular link DRX configuration parameters comprises at least one of: short DRX cycle, short DRX cycle timer, on duration timer, long DRX cycle, or long DRX start offset.

15. The UE according to claim 11, wherein the delta configuration information comprises at least one of: group indicator, type indicator, or value of delta.

16. The UE according to claim 11, wherein the operations further comprise:
receiving an activation command from the network device, wherein the activation command activates or changes the first set of sidelink DRX configuration parameters; or,
sending a sidelink communication request to the network device.

17. A system for sidelink discontinuous reception (DRX) operation, comprising: a network device and a first user equipment (UE); wherein
the network device is configured to:
obtain a first set of DRX configuration parameters; and
send the first set of DRX configuration parameters to the first UE, wherein the first set of DRX configuration parameters comprises a set of cellular link DRX configuration parameters between the first UE and the network device, and a first set of sidelink DRX configuration parameters for device to device (D2D) communication; and
the first UE is configured to:
receive the first set of DRX configuration parameters; and
operate in DRX mode on a sidelink communication according to the first set of DRX configuration parameters;
wherein the first set of sidelink DRX configuration parameters comprises delta configuration information, wherein the delta configuration information indicates a differential quantity relative to the cellular link DRX configuration parameters, wherein the set of cellular link DRX configuration parameters comprises a length of an inactivity timer for cellular link DRX, and wherein the delta configuration information comprises a value of difference between the length of the inactivity timer for cellular link DRX and a length of an inactivity timer for sidelink DRX.

18. The system according to claim 17, wherein the set of cellular link DRX configuration parameters comprises at least one of: short DRX cycle, short DRX cycle timer, on duration timer, long DRX cycle, or long DRX start offset.

19. The system according to claim 17, wherein the delta configuration information comprises at least one of: group indicator, type indicator, or value of delta.

20. The system according to claim 17, wherein
the network device is further configured to send an activation command to the first UE, wherein the activation command activates or changes the first set of sidelink DRX configuration parameters; and
the first UE is further configured to receive the activation command from the network device.

* * * * *